S. GARDNER.
Driver for Sheet-Piling.
No. 164,541.  Patented June 15, 1875.
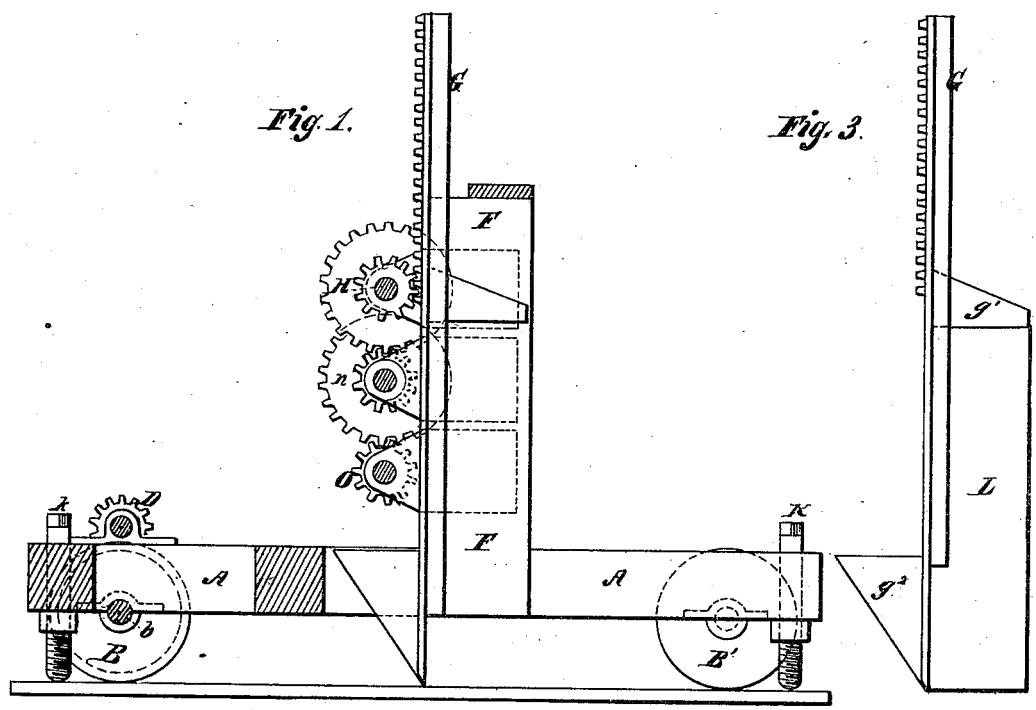
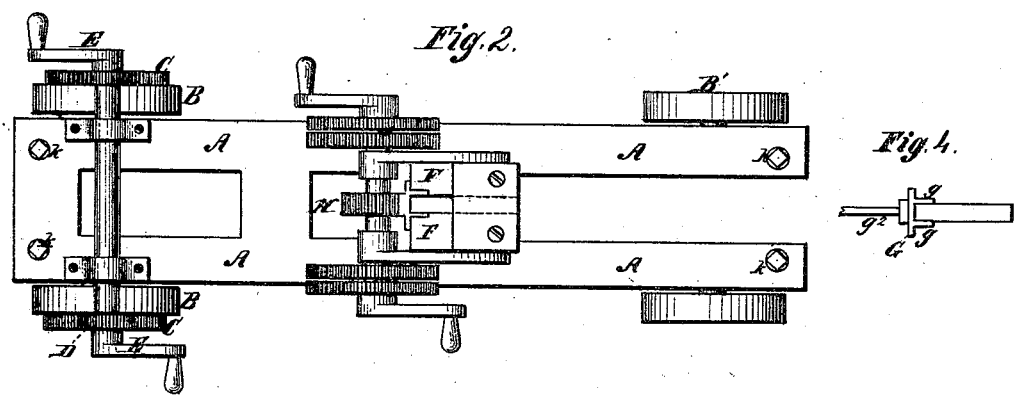
Witnesses.
Albert H. Hook
C. A. Browne
Inventor.
Smith Gardner

UNITED STATES PATENT OFFICE.

SMITH GARDNER, OF NEW YORK, N. Y., ASSIGNOR TO EPHRAIM HOWE, OF SAME PLACE.

IMPROVEMENT IN DRIVERS FOR SHEET-PILING.

Specification forming part of Letters Patent No. 164,541, dated June 15, 1875; application filed May 31, 1875.

*To all whom it may concern:*

Be it known that I, SMITH GARDNER, of the city, county, and State of New York, have invented a new and valuable machine or apparatus for inserting cores or centers of hard substance in the shape of slabs into dikes and embankments for the purpose of protecting them against the ravages of water-rats and other animals, with which the marshes along the Atlantic coast abound, and which, in a very short time, perforate and destroy embankments when constructed wholly of the soil of which the marshes are composed.

The following specification and accompanying drawings, to which I refer, clearly explain and illustrate my said invention.

Figure 1 is a vertical and longitudinal section of my machine; Fig. 2, a plan view thereof; Fig. 3, a side view of what I call a press-bar, detached and connected with a slab, $l$, standing in position to be forced down into the dike or ground upon which the dike is to be made; Fig. 4, a plan or end view of said press-bar.

The form and operation of my machine are as follows: The horizontal frame A A A A is about fourteen feet in length, and is constructed of hard, heavy timber about twelve by fourteen inches, and is mounted upon four wheels, B B B′ B′. The two front wheels are secured to the ends of an axle or shaft, which is placed across the front end of the frame $a\ a$ in suitable bearings on the under side of said frame, and is of length to project out at each side thereof to receive the wheels B B, and also the cog-wheels C C, all of which are firmly secured to it. Upon the upper side of said frame A A, and directly over the shaft to which the wheels B B and cog-wheels C C are attached, a shaft, E E, is mounted, on each end of which a pinion, D, is keyed, which gears into the cog-wheels C C. A crank is also attached to each end of this shaft, as shown in the drawings, by means of which the machine can be easily propelled from place to place, as required, the two cross-shafts revolving upon their bearings. The hind wheels B′ B′ revolve upon pivots which project out from the sides of the frame A A, as shown in the drawings. Two pieces of timber, F F, which I call uprights, are firmly attached to the frame near its center. They are about eighteen inches wide and eight inches thick, and extend up about six feet above said frame, and stand opposite to each other. The space between them corresponds with the thickness of the slabs of which the core or center is to be constructed. A groove corresponding in width with the space between the uprights is formed on the rear side of the press-bar (see Fig. 4, $g\ g$) by means of two ribs or flanges, which lie parallel to each other. They are about two inches wide and extend down from the top or upper end of the bar almost to the bottom or lower end. The fronts of the uprights are rabbeted so as to allow the ribs of the bar to fit in between them. The pinions and cog-wheels H $n$ O are hung upon shafts which are supported in brackets attached to the uprights. A strong arm, $g'$, projects from the rear side of said press-bar through the space between the uprights, and bears upon the upper end of the slabs, by means of which they are forced down into the ground, where the dike is to be erected. A rack is attached to the front side of the bar, as plainly shown in the drawings. (See Fig. 1 and Fig. 3.) The pinion H, which gears into said rack, is hung upon a shaft, which has its bearings on the front of the uprights. A crank is attached to each end of the shaft, upon which the lower pinions O are mounted. They are operated by hand, and a powerful motion is thus transmitted to the press-bar through the series of cog-wheels and pinions combined and connected, as shown in the drawing, Fig. 1 and Fig. 2. A triangular blade, $g^2$, is fitted to the lower end of the press-bar on the front side, which, as the bar descends into the ground, carrying a slab with it, cuts the sod and grass-roots of the marsh, and thus makes an opening or passage for the succeeding slab. The corners of the horizontal frame A A A A are provided with vertical set-screws $k\ k\ k\ k$, by means of which it can be beveled on the plank-track should it require it, previous to putting it in operation. A movable plank-track for the machine to stand and travel on is laid on the marsh where the dike is to be built. The machine being placed upon the track is then ready for operation, which is as follows: The press-bar is first sunk into the ground to cut the sod and grass-roots for the reception of the first slab. The machine is then moved forward, so that the slab, when placed in the groove or space between the uprights, will stand over the incision made for it in the sod. A slab, L, is then placed in between the uprights under the arm $g^1$. The press-bar being first elevated the slab is then forced down the required depth by giving motion to the cranks, and the blade $g^2$ being attached to the press-bar descends with it and makes an incision in the sod for the reception of the succeeding slab. The machine is then moved forward the distance required to receive the next slab, which, like the first, is placed in the groove between the uprights, and forced down in like manner. The slabs are thus set edge to edge the whole length of the line where the dike or embankment is to be made. The lower ends of the slabs are shaped like a wedge that they may be easily forced down. I sink them about four feet below the surface of the marsh, and they are of length to project above the surface about two feet. The projections are covered with an embankment constructed of the soil of which the marsh is composed.

I claim as my invention—

The carriage A A A A, in connection with the press-bar G, and the gearing for operating it, arranged and connected with the uprights F F, substantially as described and illustrated, and for the purpose specified.

SMITH GARDNER.

Witnesses:
C. A. BROWN,
T. H. DARLINGTON.